United States Patent
Zhang et al.

(10) Patent No.: US 11,875,256 B2
(45) Date of Patent: Jan. 16, 2024

(54) DYNAMIC COMPUTATION IN DECENTRALIZED DISTRIBUTED DEEP LEARNING TRAINING

(71) Applicant: International Business Machines Corporation, Armonk, NY (US)

(72) Inventors: Wei Zhang, Elmsford, NY (US);
Xiaodong Cui, Chappaqua, NY (US);
Abdullah Kayi, Westchester, NY (US);
Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 16/925,178

(22) Filed: Jul. 9, 2020

(65) Prior Publication Data
US 2022/0012584 A1 Jan. 13, 2022

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ............ G06F 9/46; G06N 3/08; G06N 3/045
See application file for complete search history.

(56) References Cited

U.S. PATENT DOCUMENTS

| 8,695,009 B2 * | 4/2014 | Vojnovic ............... G06F 9/5038 718/104 |
| 9,939,792 B2 | 4/2018 | Chen et al. |

(Continued)

FOREIGN PATENT DOCUMENTS

| CN | 104598972 A | 5/2015 |
| CN | 109492753 A | 3/2019 |

(Continued)

OTHER PUBLICATIONS

Author—Jianmin Chen, Xinghao Pan, Rajat Monga, Samy Bengio Title—Revisiting Distributed Synchronous SGD Date—2017 Publisher—ICLR 2017 (Year: 2017).*

(Continued)

*Primary Examiner* — Markus A. Vasquez
(74) *Attorney, Agent, or Firm* — Donald J. O'Brien

(57) ABSTRACT

Embodiments of a method are disclosed. The method includes performing decentralized distributed deep learning training on a batch of training data. Additionally, the method includes determining a training time wherein the learner performs the decentralized distributed deep learning training on the batch of training data. Further, the method includes generating a table having the training time and other processing times for corresponding other learners performing the decentralized distributed deep learning training on corresponding other batches of other training data. The method also includes determining that the learner is a straggler based on the table and a threshold for the training time. Additionally, the method includes modifying a processing aspect of the straggler to reduce a future training time of the straggler for performing the decentralized distributed deep learning training on a new batch of training data in response to determining the learner is the straggler.

12 Claims, 8 Drawing Sheets

(56) References Cited

U.S. PATENT DOCUMENTS

| | | | |
|---|---|---|---|
| 10,963,300 | B2 | 3/2021 | Champigny |
| 11,243,814 | B2 | 2/2022 | Shen |
| 11,461,213 | B2 | 10/2022 | Agrawal |
| 2011/0247003 | A1 | 10/2011 | Fong et al. |
| 2016/0103901 | A1 | 4/2016 | Kadav |
| 2017/0091668 | A1 | 3/2017 | Kadav et al. |
| 2018/0129969 | A1 | 5/2018 | Feng |
| 2018/0253646 | A1 | 9/2018 | Feng et al. |
| 2018/0293463 | A1 | 10/2018 | Brown |
| 2018/0300171 | A1 | 10/2018 | Qiao |
| 2019/0042934 | A1 | 2/2019 | Arunachalam et al. |
| 2019/0155620 | A1 | 5/2019 | Arunachalam |
| 2019/0171935 | A1 | 6/2019 | Agrawal |
| 2020/0042362 | A1 | 2/2020 | Cui et al. |
| 2020/0104127 | A1 | 4/2020 | Grover |
| 2020/0184320 | A1 | 6/2020 | Croxford |
| 2020/0387777 | A1 | 12/2020 | Avestimehr |
| 2021/0034374 | A1 | 2/2021 | Saxena |
| 2021/0133555 | A1 | 5/2021 | Qiu |
| 2021/0176174 | A1 | 6/2021 | Chou |
| 2021/0194831 | A1 | 6/2021 | Huang |
| 2022/0004933 | A1 | 1/2022 | Gu |
| 2022/0012584 | A1* | 1/2022 | Zhang ............... G06N 3/063 |
| 2022/0012629 | A1* | 1/2022 | Zhang ............... G06N 20/00 |
| 2022/0012642 | A1 | 1/2022 | Zhang |
| 2023/0012487 | A1 | 1/2023 | Makaya |
| 2023/0068386 | A1 | 3/2023 | Akdeniz |
| 2023/0145437 | A1 | 5/2023 | Costa |

FOREIGN PATENT DOCUMENTS

| | | |
|---|---|---|
| CN | 110659745 A | 1/2020 |
| WO | 2019183195 A1 | 9/2019 |

OTHER PUBLICATIONS

Author—Chen Chen, Qizhen Weng, Wei Wang, Baochun Li, Bo Li Title—Fast Distributed Deep Learning via Worker-adaptive Batch Sizing Date—Jun. 7, 2018 Publisher—Arvix.org (Year: 2018).*

Author—Sophie Sirois Title—What is Processor Speed and Why Does it Matter? Date—Dec. 2018 Publisher—Hewlett Packard (Year: 2018).*

Lian, Xiangru, et al. "Can Decentralized Algorithms Outperform Centralized Algorithms? A Case Study for Decentralized Parallel Stochastic Gradient Descent." arXiv preprint arXiv:1705.09056 (2017). (Year: 2017).*

Harlap, Aaron, et al. "Addressing the straggler problem for iterative convergent parallel ML." Proceedings of the seventh ACM symposium on cloud computing. 2016. (Year: 2016).*

Chen et al., "Fast Distributed Deep Learning via Worker-adaptive Batch Sizing", SoCC '18, Oct. 11-13, 2018, 1 page.

Jiang et al., "Heterogeneity-aware Distributed Parameter Servers", SIGMOD'17, May 14-19, 2017, pp. 463-478.

Chen et al., "Revisiting distributed synchronous SGD", Mar. 21, 2017, pp. 1-10.

Yao et al., "FluentPS: A Parameter Server Design with Low-frequency Synchronization for Distributed Deep Learning", Conference Paper • Sep. 2019, 12 pages.

Yang et al., "An adaptive batch-orchestration algorithm for the heterogeneous GPU cluster environment in distributed deep learning system", 2018 IEEE International Conference on Big Data and Smart Computing, pp. 725-728.

Basu et al., "Balancing stragglers against staleness in distributed deep learning", 2018 IEEE 25th International Conference on High Performance Computing (HiPC), pp. 12-21.

Jayarajan, A., "Priority-based parameter propagation for distributed deep neural network training", Aug. 2019, 50 pages.

Luo et al., "Parameter Hub: A Rack-Scale Parameter Server for Distributed Deep Neural Network Training", May 21, 2018, 15 pages.

Yu et al., "GradiVeQ: Vector Quantization for Bandwidth-Efficient Gradient Aggregation in Distributed CNN Training", 32nd Conference on Neural Information Processing Systems, Dec. 31, 2018, 12 pages.

Lin et al., "Deep Gradient Compression: Reducing the Communication Bandwidth for Distributed Training", Feb. 16, 2018, 14 pages.

Chen et al., "AdaComp: Adaptive Residual Gradient Compression for Data-Parallel Distributed Training", The Thirty-Second AAAI Conference on Artificial Intelligence (AAAI-18), 2018, pp. 2827-2835.

Zhang et al., "Dynamic Computation Rates for Distributed Deep Learning", U.S. Appl. No. 16/925,161, filed Jul. 9, 2020.

Zhang et al., "Dynamic Network Bandwidth in Distributed Deep Learning Training", U.S. Appl. No. 16/925,192, filed Jul. 9, 2020.

IBM, List of IBM Patents or Patent Applications Treated as Related, Jun. 17, 2020, 2 pages.

Amiri et al., "Computation Scheduling for Distributed Machine Learning with Straggling Workers" May 23, 2019, arXiv: 1810.09992v3, pp. 1-13. (Year: 2019).

Behrouzi-Far et Soljanin, "Efficient Replication for Straggler Mitigation in Distributed Computing" Jun. 3, 2020, arXiv: 2006.02318v1, pp. 1-19. (Year: 2020).

Bitar et al., "Stochastic Gradient Coding for Straggler Mitigation in Distributed Learning" May 14, 2019, arXiv: 1905.05383v1, pp. 1-23. (Year: 2019).

Dutta et al., "Slow and Stale Gradients Can Win the Race: Error-Runtime Trade-offs in Distributed SGD" 2018, pp. 1-10. (Year: 2018).

Ferdinand et al., "Anytime Minibatch: Exploiting Stragglers in Online Distributed Optimization" Jun. 10, 2020, arXiv: 2006.05752v1, pp. 1-26. (Year: 2020).

Geng et al., "Elastic Pipe: An Efficient and Dynamic Model-Parallel Solution to DNN Training" Jun. 25, 2019, pp. 5-9. (Year: 2019).

Geng et al., "Fela: Incorporating Flexible Parallelism and Elastic Tuning to Accelerate Large-Scale DML" May 27, 2020, pp. 1393-1404. (Year: 2020).

Hoi et al., "Online Feature Selection for Mining Big Data" Aug. 12, 2012, pp. 93-100. (Year: 2012).

Mallick et al., "Rateless Codes for Near-Perfect Load Balancing in Distributed Matrix-Vector Multiplication" Oct. 30, 2019, arXiv: 1804.10331v5, pp. 1-40. (Year: 2019).

Narra et al., "Slack Squeeze Coded Computing for Adaptive Straggler Mitigation" Nov. 2019, pp. 1-16. (Year: 2019).

Ozfatura et al., "Age-Based Coded Computation for Bias Reduction in Distributed Learning" Jun. 2, 2020, arXiv: 2006.01816v1, pp. 1-6. (Year: 2020).

U.S. Appl. No. 16/925,161,—Notice of References Cited, dated May 10, 2023.

Yang et al., "BOA: batch orchestration algorithm for straggler mitigation of distributed DL training in heterogeneous GPU cluster" Apr. 16, 2019, pp. 47-67. (Year: 2019).

Yu et al., "Entangled Polynomial Codes for Secure, Private, and Batch Distributed Matrix Multiplication: Breaking the 'Cubic' Barrier" Apr. 13, 2020, arXiv: 2001.05101v2, pp. 1-14. (Year: 2020).

Yu et al., "Layered SGD: A Decentralized and Synchronous SGD Algorithm for Scalable Deep Neural Network Training" Jun. 13, 2019, arXiv: 1906.05936v1, pp. 1-7. (Year: 2019).

Zhang et Simeone, "LAGC: Lazily Aggregated Gradient Coding for Straggler-Tolerant and Communication-Efficient Distributed Learning" Apr. 8, 2020, arXiv: 1905.09148v2, pp. 1-24. (Year: 2020).

Zhou et al., "Falcon: Towards Computation-Parallel Deep Learning in Heterogeneous Parameter Server" 2019, pp. 196-206. (Year: 2019).

U.S. Appl. No. 16/925,192,13 Notice of Reference Cited, dated Nov. 22, 2022.

Cai et al., "D2D-Enabled Data Sharing for Distributed Machine Learning at Wireless Network Edge" Jan. 28, 2020, arXiv: 2001.11342v1, pp. 1-5. (Year: 2020).

Chaudhary et al., "Balancing Efficiency and Fairness in Heterogeneous GPU Clusters for Deep Learning" Apr. 2020, pp. 1-16. (Year: 2020).

(56) References Cited

OTHER PUBLICATIONS

Guo et al., "Efficient Gradient Descent via Value Staleness Analysis for Heterogeneous Deep Learning Systems" 2019, pp. 31-36. (Year: 2019).

Hanna et al., "Adaptive Distributed Stochastic Gradient Descent for Minimizing Delay in the Presence of Stragglers" Feb. 25, 2020, arXiv: 2002.11005v1, pp. 1-5. (Year: 2020).

Ilager et al., "A Data-Driven Frequency Scaling Approach for Deadline-aware Energy Efficient Scheduling on Graphics Processing Units (GPUs)" Apr. 28, 2020, arXiv: 2004.08177v2, pp. 1-10. (Year: 2020).

Jiang et al., "Heterogeneity-aware Distributed Parameter Servers" May 2017, pp. 1-16. (Year: 2017).

Koliousis et al., "Crossbow: Scaling Deep Learning with Small Batch Sizes on Multi-GPU Servers" Jan. 8, 2019, arXiv: 1901.02244v1, pp. 1-14. (Year: 2019).

Mo, X. et al "Energy-Efficient Federated Edge Learning with Joint Communication and Computation Design" Feb. 29, 2020, arXiv: 2003.00199v1, pp. 1-28. (Year: 2020).

Notices of References, U.S. Appl. No. 16/925,161, dated Oct. 12, 2023, 3 pgs.

Saxena et al., "Effective Elastic Scaling of Deep Learning Workloads" Jun. 24, 2020, arXiv: 2006.13878v1, pp. 1-15. (Year: 2020.

Wang et al., "Communication Contention Aware Scheduling of Multiple Deep Learning Training Jobs" Feb. 24, 2020, arXiv: 2002.10105v1, pp. 1-12. (Year: 2020).

Zheng et al., "Cynthia: Cost-Efficient Cloud Resource Provisioning for Predictable Distributed Deep Neural Network Training" Aug. 2019, pp. 1-11. (Year: 2019).

\* cited by examiner

| 204-1 TRAINING TIME VECTOR | |
|---|---|
| LEARNER ID | TRAINING TIME |
| 202-1 | 55 NS |
| 202-2 | 70 NS |
| 202-3 | |
| 202-4 | |
| 202-5 | 94 NS |

| 204-2 TRAINING TIME VECTOR | |
|---|---|
| LEARNER ID | TRAINING TIME |
| 202-1 | 55 NS |
| 202-2 | 70 NS |
| 202-3 | 65 NS |
| 202-4 | |
| 202-5 | |

| 204-3 TRAINING TIME VECTOR | |
|---|---|
| LEARNER ID | TRAINING TIME |
| 202-1 | |
| 202-2 | 70 NS |
| 202-3 | 65 NS |
| 202-4 | 52 NS |
| 202-5 | |

| 204-4 TRAINING TIME VECTOR | |
|---|---|
| LEARNER ID | TRAINING TIME |
| 202-1 | |
| 202-2 | |
| 202-3 | 65 NS |
| 202-4 | 52 NS |
| 202-5 | 94 NS |

| 204-5 TRAINING TIME VECTOR | |
|---|---|
| LEARNER ID | TRAINING TIME |
| 202-1 | 55 NS |
| 202-2 | |
| 202-3 | |
| 202-4 | 52 NS |
| 202-5 | 94 NS |

FIG. 2C

| 204-1 TRAINING TIME VECTOR | |
|---|---|
| LEARNER ID | TRAINING TIME |
| 202-1 | 54 NS |
| 202-2 | 68 NS |
| 202-3 | 65 NS |
| 202-4 | 52 NS |
| 202-5 | 94 NS |

| 204-2 TRAINING TIME VECTOR | |
|---|---|
| LEARNER ID | TRAINING TIME |
| 202-1 | 54 NS |
| 202-2 | 68 NS |
| 202-3 | 63 NS |
| 202-4 | 52 NS |
| 202-5 | 94 NS |

| 204-3 TRAINING TIME VECTOR | |
|---|---|
| LEARNER ID | TRAINING TIME |
| 202-1 | 55 NS |
| 202-2 | 68 NS |
| 202-3 | 63 NS |
| 202-4 | 51 NS |
| 202-5 | 92 NS |

| 204-4 TRAINING TIME VECTOR | |
|---|---|
| LEARNER ID | TRAINING TIME |
| 202-1 | 55 NS |
| 202-2 | 68 NS |
| 202-3 | 63 NS |
| 202-4 | 51 NS |
| 202-5 | 92 NS |

| 204-5 TRAINING TIME VECTOR | |
|---|---|
| LEARNER ID | TRAINING TIME |
| 202-1 | 54 NS |
| 202-2 | 70 NS |
| 202-3 | 65 NS |
| 202-4 | 51 NS |
| 202-5 | 92 NS |

FIG. 2D

DYNAMIC COMPUTATION IN DECENTRALIZED DISTRIBUTED DEEP LEARNING TRAINING

BACKGROUND

The present disclosure relates to distributed deep learning training, and more specifically, to dynamic computation in decentralized distributed in deep learning training.

Deep learning training is a technological field that represents a subset of machine learning. Machine learning involves teaching a computer algorithm, i.e., the machine, to label a data record in some way, e.g., labelling the subject of a photograph as animate or inanimate. Machine learning involves training the computer algorithm to make the classification by providing labeled examples, e.g., picture subjects labeled as animate or not. In machine learning training, a classification task is performed repeatedly in order to gradually improve the accuracy of the classification. Deep learning training involves making these same classifications but can use neural networks, which mimic learning in the human brain. Such learning is possible due to multiple layers of computational logic that enable progressive learning, i.e., enable the machine to get better at the classification.

SUMMARY

Embodiments of a method are disclosed. The method includes performing decentralized distributed deep learning training on a batch of training data. Additionally, the method includes determining a training time wherein the learner performs the decentralized distributed deep learning training on the batch of training data. Further, the method includes generating a table having the training time and other processing times for corresponding other learners performing the decentralized distributed deep learning training on corresponding other batches of other training data. The method also includes determining that the learner is a straggler based on the table and a threshold for the training time. Additionally, the method includes modifying a processing aspect of the straggler to reduce a future training time of the straggler for performing the decentralized distributed deep learning training on a new batch of training data in response to determining the learner is the straggler.

Further aspects of the present disclosure are directed toward systems and computer program products with functionality similar to the functionality discussed above regarding the computer-implemented methods. The present summary is not intended to illustrate each aspect of every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 2C is a block diagram of example training time vectors in association with a first neighbor communication in the system for dynamic computation in decentralized distributed deep learning training, in accordance with some embodiments of the present disclosure.

FIG. 2D is a block diagram of example training time vectors in association with a second neighbor communication in the system for dynamic computation in decentralized distributed deep learning training, in accordance with some embodiments of the present disclosure.

Figure 1:
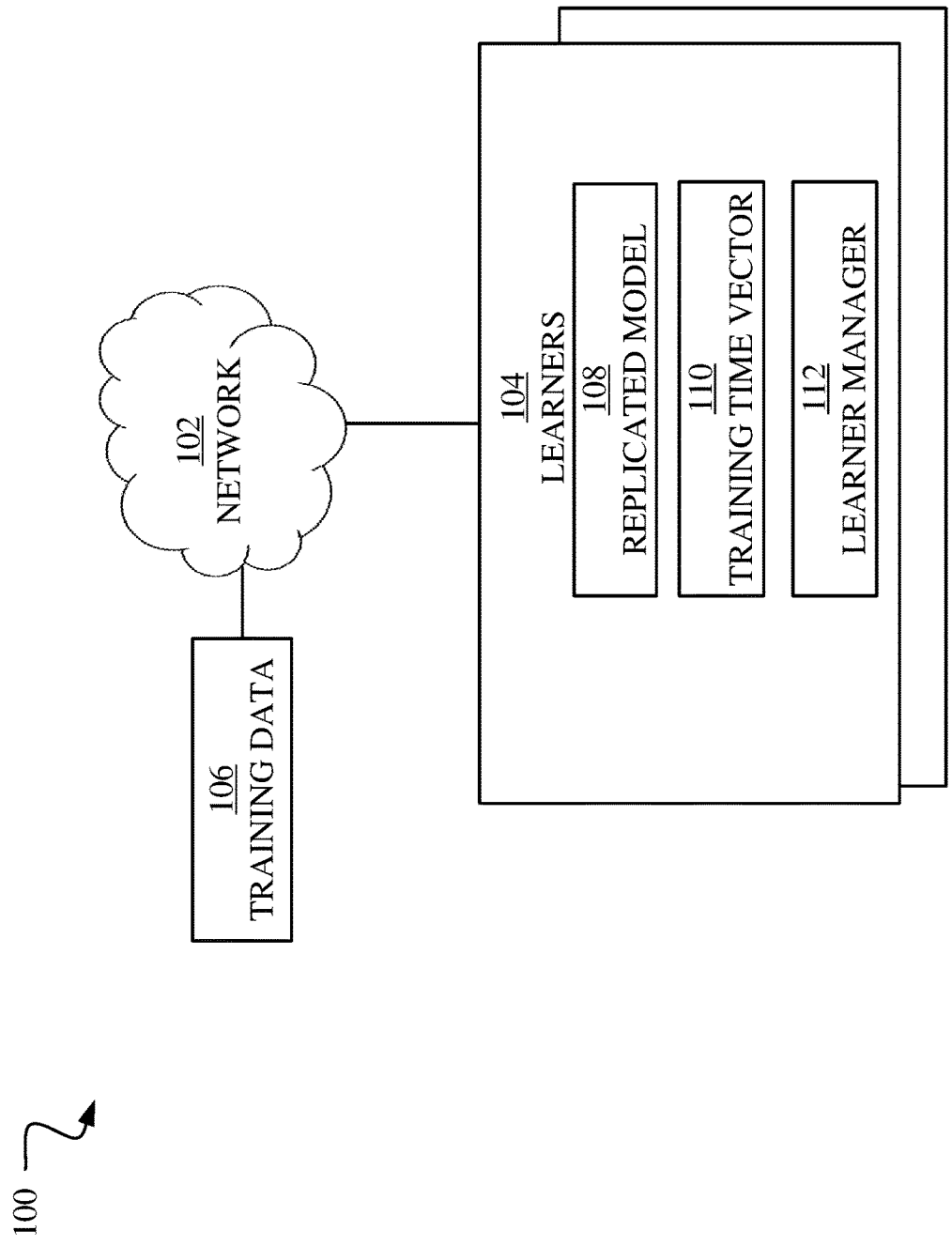
FIG. 1 is a block diagram of an example system for dynamic computation in decentralized distributed deep learning training, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Machine learning is a process wherein a computer algorithm is trained to make a specific classification. For example, machine learning algorithms (learners) can be trained to identify classes of objects in a digital photograph, predict a future shopping choice of a potential customer in a marketing database, and so on. However, training learners can be computationally expensive. In other words, training can involve relatively large numbers of computational decision-making. As such, training can take a relatively large amount of time, which may violate constraints on the relevance of the trained classification. For example, a future sale may be scheduled for a holiday weekend. Accordingly, training a machine learning algorithm to predict future shopping choices may not be relevant once the holiday weekend has passed. Thus, using distributed deep learning training, it is possible to reduce the amount of time involved in training.

Distributed deep learning training refers to a computational architecture that performs these layers of computational logic in parallel by using multiple compute nodes to perform different parts of the classification problem. In this way, distributed deep learning training can reduce the amount of time to train and improve the speed with which deep learning training systems learn.

Distributed deep learning training can involve either a central or decentralized control. In a decentralized control, the learners can distribute training data to other learners, determine and adjust training parameters, and the like. These controls can be synchronous or asynchronous. Synchronous control means that the training of the multiple learners is concurrent, or processed within an overlapping time period. Asynchronous control means that the training time periods may not overlap.

In this way, a decentralized synchronous distributed deep learning training approach can be a useful solution for finding solutions to classifications and convergence in machine learning. However, this approach may not be time efficient because of the straggler problem. The straggler problem refers to scenarios where slow learners can use a disproportionate amount of the overall clock time of the training, according to Amdahl's Law. In this way, the straggler can create a bottleneck because all other learners may wait until the straggler has finished before processing another batch of training data. Additionally, synchronous collective communication can result in hot spots and accordingly performance degradation due to bandwidth issues between the learners and the central control.

Accordingly, some embodiments of the present disclosure can dynamically adjust the computation for decentralized distributed deep learning training. Dynamically adjusting the computation can balance the amount of time that stragglers use with the amount of time that the rest of the learners use to perform their training. In this way, some embodiments of the present disclose can improve the run-time performance, and reduce the power consumption, of decentralized distributed deep learning training.

FIG. 1 is a block diagram of an example system 100 for determining dynamic computation in decentralized distributed deep learning training, in accordance with some embodiments of the present disclosure. The system 100 includes a network 102, learners 104, and training data 106.

The learners 104 can include a replicated model 108, training time vector 110, and a learner manager 112. The replicated model 108 can be a machine learning model that the learner 104 uses to make classifications. The replicated model 108 can be replicated across each of the learners 104. The training time vector 110 can be a vector of data that documents the amount of training time that the learners 104 take to process each batch of training data 106. Additionally, the learners 104 can include a learner manager 112. The learner manager 112 can identify stragglers in the learners 104 based on the amount of time the learners 104 take to process each batch of training data 106.

The training data 106 can be multiple records that the learners 104 classify using the locally replicated models 108. Additionally, the training data 106 can include labels that indicate the correct classifications. In this way, the learners 104 can determine when their classifications are correct. Accordingly, the learners can adjust specific parameters used to make the classifications based on whether classifications are correct. These parameters are also referred to herein as weights and gradients.

More specifically, the learners 104 can distribute the training data 106, amongst themselves, along with a locally determined weight for the learner 104. The learners 104 can be arranged in a network ring, wherein each learner 104 can communicate with its directly connected neighbors on the network ring. The network ring is described in greater detail with respect to FIG. 2A. The learners 104 can also perform gradient computation and weight updates locally. Additionally, the learners 104 can locally determine a weight based on the gradients of the learner 104 and its directly connected neighbors. Further, all the learners 104 can coordinate the computation of the local weight updates by taking an average of the locally determined weights. As each of the learners 104 acquire training time information from their neighbors, it is possible for all of the training time vectors 110 to include training times for all the learners 104.

In some embodiments, the learner manager 112 can use the training time vectors 110 to identify stragglers. The learner manager 112 can base the determination on whether the training time of each of the learners 104 exceeds a predetermined threshold. In some embodiments, stragglers may also be repeat offenders. In other words, the learner manager 112 may identify stragglers as learners 104 that exceed the predetermined threshold for multiple batches of training data 106. Accordingly, the learners 104 may reduce the amount of training data 106 for the stragglers. Further, the learners 104 can distribute the reduced number of training data 106 records to the remaining learners 104. In this way, the straggler can reduce the amount of time performing the training by reducing the number of training data 106 records processed.

In some embodiments, the learner manager 112 can adjust the frequency rate of a computational processor of the straggler. By increasing the frequency rate, the learner manager 112 can reduce the amount of time that the straggler takes to process the training data 106 without reducing the number of training data 106 records. In some embodiments, the learner manager 112 can perform some combination of reducing training data 106 records and increasing the frequency rate of the straggler. In some embodiments, the learner manager 112 can reduce the frequency rate of all learners 104 but the straggler. In this way, the learner manager 112 balances the amount of training time by increasing the training time for the learners 104 that are not straggling.

Figure 2A:
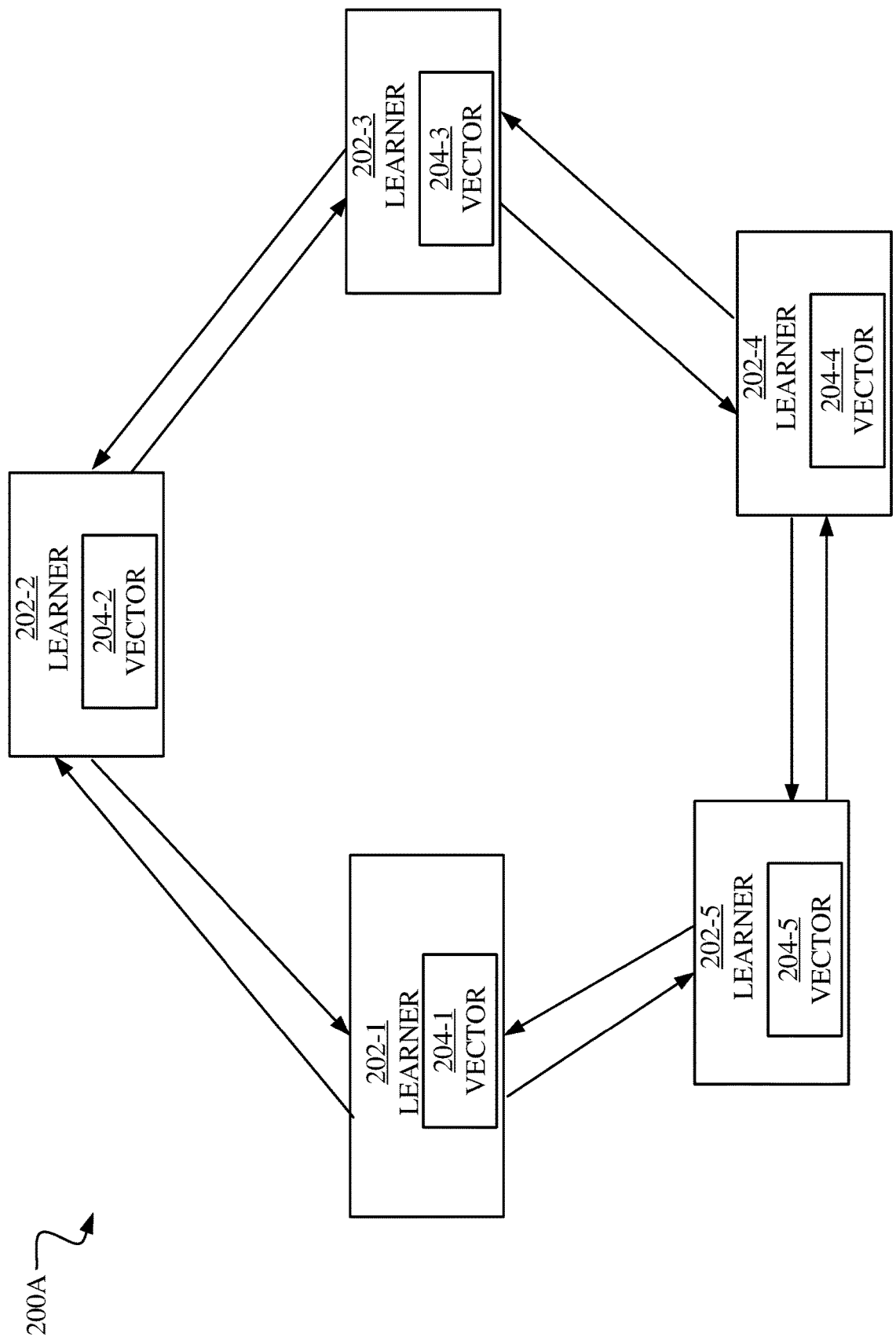
FIG. 2A is an example system for dynamic computation in decentralized distributed deep learning training, in accordance with some embodiments of the present disclosure.

FIG. 2A is an example system 200A for dynamic computation in decentralized distributed deep learning training, in accordance with some embodiments of the present disclosure. The system 200A includes learners 202-1 through 202-5 (also referred to herein collectively as learners 202) arranged in a ring network. The learners 202 can be similar to the learners 104 described with respect to FIG. 1. A ring network is a network topology wherein each compute node, e.g., learner 202, is directly connected to two other compute nodes and includes all the compute nodes of the ring network. In this example, the learners 202-1 through 202-5 respectively include vectors 204-1 through 204-5 (also referred to herein collectively as vectors 204). The vectors 204 can be similar to the training time vector 110 described with respect to FIG. 1. Thus, the vectors 204 can include the training times for the learners 202.

In decentralized distributed deep learning training, the learners 202 can determine a local gradient based on its training for a batch of training data, and communicate the local gradient to the learner's two neighbors. Additionally, the learners 202 can locally determine the weight W based on the local gradients ΔW of each learner 202 and its two neighbors. In the system 200A, the arrows indicate the communication between the learners 202. As shown, each learner both sends and receives information to its two neighbors.

Additionally, the learner sends the vectors 204 to its two neighbors. In this way, the learners 202 can distribute the training times from all learners 202 to all the vectors 204. Further, by comparing the training times for all the learners in the vectors 204, it is possible for each learner 202 to determine whether it is a straggler, and modify a processing aspect of itself. Modifying the processing aspect can involve adjusting the sizes of the training data batches for all the learners, e.g., reducing the number of training data records for the straggler, and distributing the reduction to the remaining learners 202. In some embodiments, modifying the processing aspect can involve modifying the frequency rate of the processors of the learners 202. For example, the frequency rate of the straggler's processor can be increased. Conversely, the frequency rate of the remaining learners 202 can be decreased.

In some embodiments, the learners 202 can modify the processing aspect of the learners using sense and actuate components (not shown). The sense component can identify the straggler(s). Additionally, the actuate component can dynamically act on output from the sense component by balancing the training time of the learners 202 as described above.

Figure 2B:
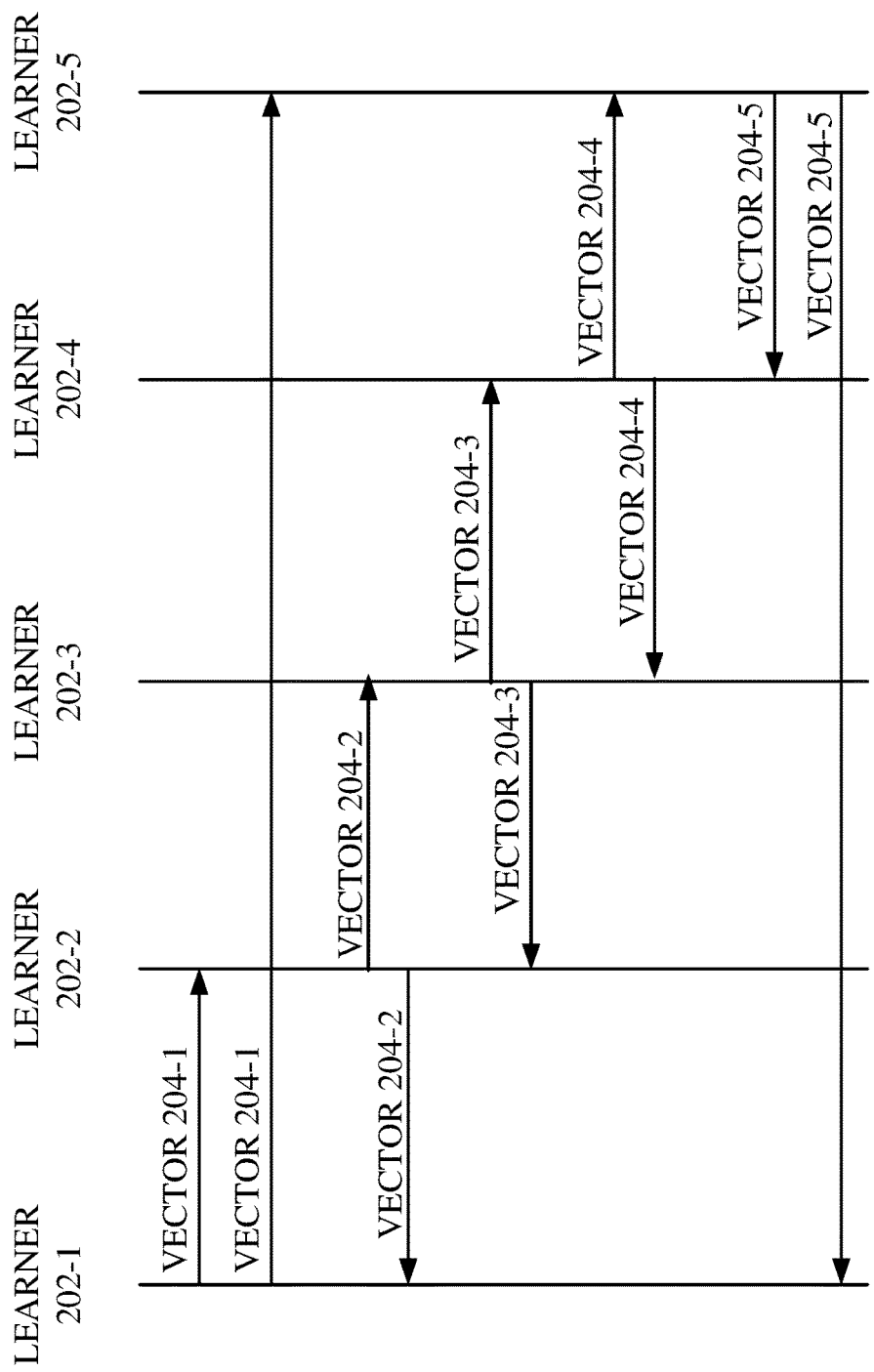
FIG. 2B is an example message flow diagram of a system for dynamic computation in decentralized distributed deep learning training, in accordance with some embodiments of the present disclosure.

FIG. 2B is a message flow diagram 200B of the system 200A for dynamic computation in decentralized distributed deep learning training, in accordance with some embodiments of the present disclosure. The message flow diagram 200B represents some of the neighbor communications between the learners 202-1 through 202-5.

As shown, the learner 202-1 sends the vector 204-1 to its directly connected neighbors in the network ring of system 200A, learner 202-2 and 202-5. Similarly, the learner 202-2 sends the vector 204-2 to its directly connected neighbors, learner 202-1 and 202-3. Additionally, the learner 202-3 sends the vector 204-3 to its directly connected neighbors, learner 202-2 and 202-4. Further, the learner 202-4 sends the vector 204-4 to its directly connected neighbors, learner 202-3 and 202-5. Also, the learner 202-5 sends the vector 204-5 to its directly connected neighbors, learner 202-4 and 202-1.

FIG. 2C is a block diagram of example training time vectors 204 in association with a first neighbor communication in the decentralized distributed deep learning training of system 200A, in accordance with some embodiments of the present disclosure. The vectors 204 can represent the vectors 204 after the learners 202 perform training for one batch of training data. Accordingly, the vectors 204 can include the local training time for each of the learners 202 and the learner's neighbors. Thus, the vector 204-1 includes the training times for learners 202-1, 202-2, and 202-5. Similarly, the vector 204-2 includes the training times for learners 202-1, 202-2, and 202-3. Additionally, the vector 204-3 includes the training times for learners 202-2, 202-3, and 202-4. Further, the vector 204-4 includes the training times for learners 202-3, 202-4, and 202-5. Also, the vector 204-5 includes the training times for learners 202-4, 202-5, and 202-1.

FIG. 2D is a block diagram of example training time vectors 204 in association with a second neighbor communication in the decentralized deep learning training of system 200A, in accordance with some embodiments of the present disclosure. The vectors 204 can represent the vectors 204 after the learners 202 perform training for a second batch of training data. Accordingly, the vectors 204 can include the local training time for each of the learners 202 and the learners 202 that are in the neighbors' vectors. Thus, each of the vectors 204 includes training times for all other learners 202.

Thus, the vector 204-1 is updated with the training times for the new batches processed by learners 202-1, 202-2, and 202-5. Additionally, the vector 204-1 is updated with the training times from the vector 204-2 and 204-5. The vectors 204-2 and 204-5 provide the training times for learners 202-3, and 202-4, respectively.

Similarly, the vector 204-2 is updated with the training times for the new batches processed by learners 202-1, 202-2, and 202-3. Additionally, the vector 204-2 is updated with the training times from the vector 204-1 and 204-3. The vectors 204-1 and 204-3 provide the training times for learners 202-5, and 202-4, respectively.

Additionally, the vector 204-3 is updated with the training times for the new batches processed by learners 202-2, 202-3, and 202-4. Additionally, the vector 204-3 is updated with the training times from the vector 204-2 and 204-4. The vectors 204-2 and 204-4 provide the training times for learners 202-1, and 202-5, respectively.

Further, the vector 204-4 is updated with the training times for the new batches processed by learners 202-3, 202-4, and 202-5. Additionally, the vector 204-4 is updated with the training times from the vector 204-3 and 204-5. The vectors 204-3 and 204-5 provide the training times for learners 202-2, and 202-1, respectively.

Also, the vector 204-5 is updated with the training times for the new batches processed by learners 202-4, 202-5, and 202-1. Additionally, the vector 204-5 is updated with the training times from the vector 204-1 and 204-4. The vectors 204-1 and 204-4 provide the training times for learners 202-2, and 202-3, respectively.

It is noted that the system 200A includes five learners 202. Thus, it is possible to fully populate all the vectors 204 with two rounds of neighbor communications. In systems with more learners 202, completing the vectors 204 for all learners 202 may involve additional neighbor communications.

Figure 3:
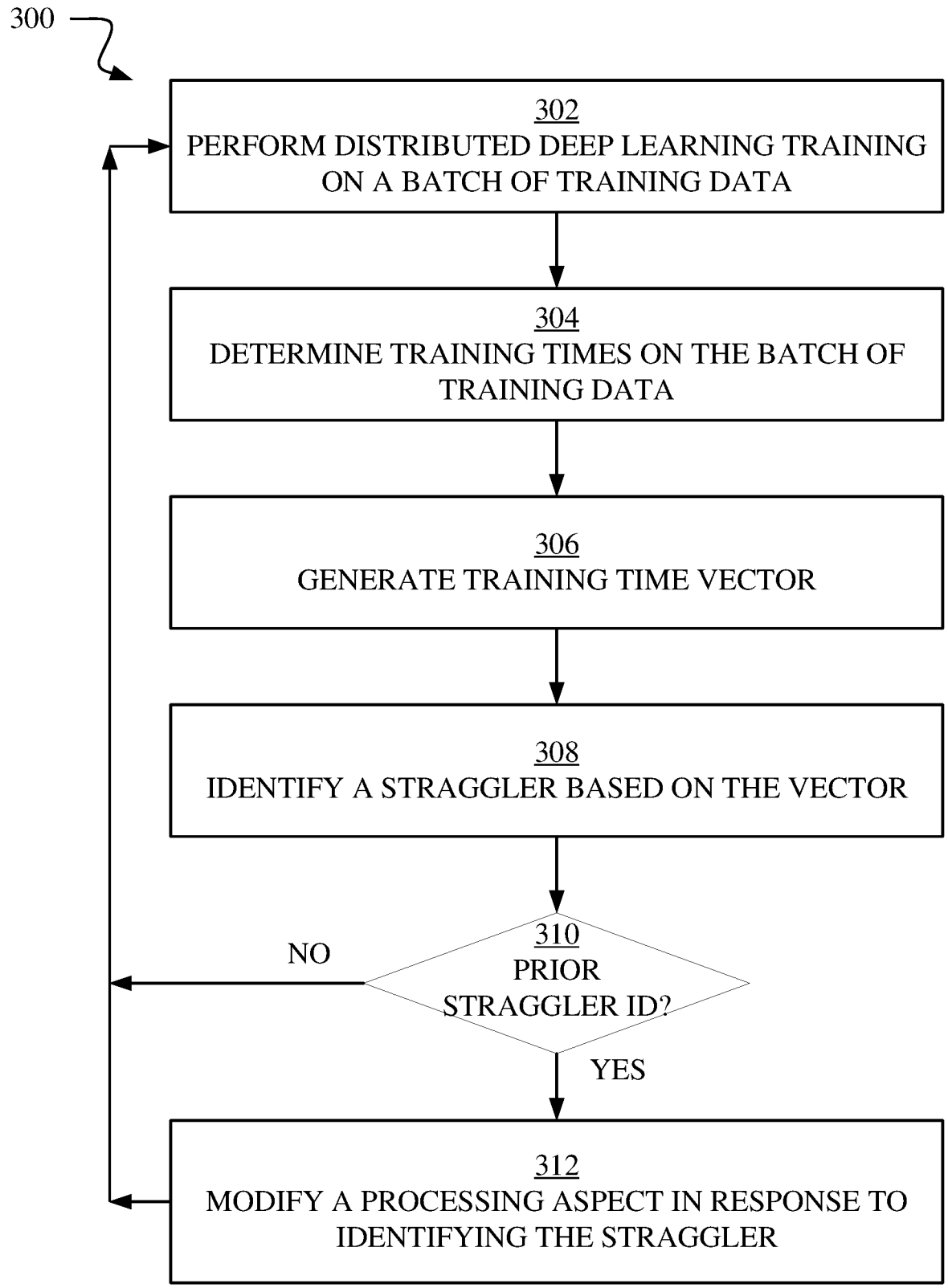
FIG. 3 is a process flow diagram of a method for determining dynamic computation in decentralized distributed deep learning training, in accordance with some embodiments of the present disclosure.

FIG. 3 is a process flow diagram of a method 300 for determining dynamic computation in decentralized distributed deep learning training, in accordance with some embodiments of the present disclosure. In some embodiments of the present disclosure, the learners 104 and the learner manager 112, described with respect to FIG. 1, may perform the method 300.

At operation 302, the learners 104 can perform distributed deep learning training on one batch of training data, such as, the training data 106. Performing distributed deep learning training can involve performing classifications on each of the records on batches of training data 106. Additionally, distributed deep learning training can involve adjusting weights and gradients based on the correctness of the classifications.

At operation 304, the learner manager 112 can determine the training times of the learners 104 on the batches of training data 106. Determining the training times can involve identifying start and stop times between when an individual learner 104 performs the processing for its batch of training data 106. Additionally, determining the training times can include receiving training times from neighbors of the learner 104. As stated previously, the learners 104 may send their training time vectors 110 to each other, which can include the additional training times. In some embodiments, the learner manager 112 can average the training times received in repeated communications of training time vectors 110 between neighbors.

At operation 306, the learners 104 can generate a training time vector, such as the training time vector 110. Generating the training time vector 110 can involve populating the training time vector 110 with the training times for the individual learner 104 and the learners with training times in the received training time vectors 110 from the learner's neighbors.

At operation 308, the learners 104 can identify a straggler based on the training time vector 110. The straggler can be a learner 104 with the longest training time, and/or with a training time that exceeds a predetermined threshold. Alternatively, the straggler can have a training time outside a threshold time. In some embodiments, the threshold time can be based on the standard deviation of the training times of all the learners 104. In some embodiments, the learner manager 112 can identify multiple stragglers.

At operation 310, the learner manager 112 can determine if the identified straggler has been previously identified as a straggler. In this way, the learner manager 112 can limit identified stragglers to those that exceed the predetermined threshold multiple times. Thus, if the identified straggler has no prior straggler identification, control may flow back to operation 302 for further training. However, if the identified straggler has a prior straggler identification, control may flow to operation 312.

At operation 312, the learner manager 112 can modify a processing aspect in response to identifying the straggler. Modifying the processing aspect can include reducing the amount of training data 106 for the straggler, increasing the frequency rate of a computational processor of the straggler, and/or reducing the frequency rate of the remaining learners. In some embodiments, the batch size of the reduced training data can be linearly proportional to the batch execution time, i.e., the training time of the straggler. Additionally, adjusting the batch size for stragglers can balance out their future batch execution time compared to the rest of the learners 104.

In some embodiments, the method 300 can include a control loop to balance learners 104 by detecting future imbalance cases and acting as described above. Additionally, in some embodiments, the method 300 can include a feedback loop to determine if there is a ping-pong effect on the same learner 104. The ping-pong effect can refer to a scenario where the same learner is repeatedly identified as a straggler and sped up, then not identified as a straggler and slowed down, repeatedly. In such a case, the feedback loop may stop the repeat identifications by keeping the ping-ponging learner in one category or the other, e.g., a straggler or non-straggler.

Figure 4:
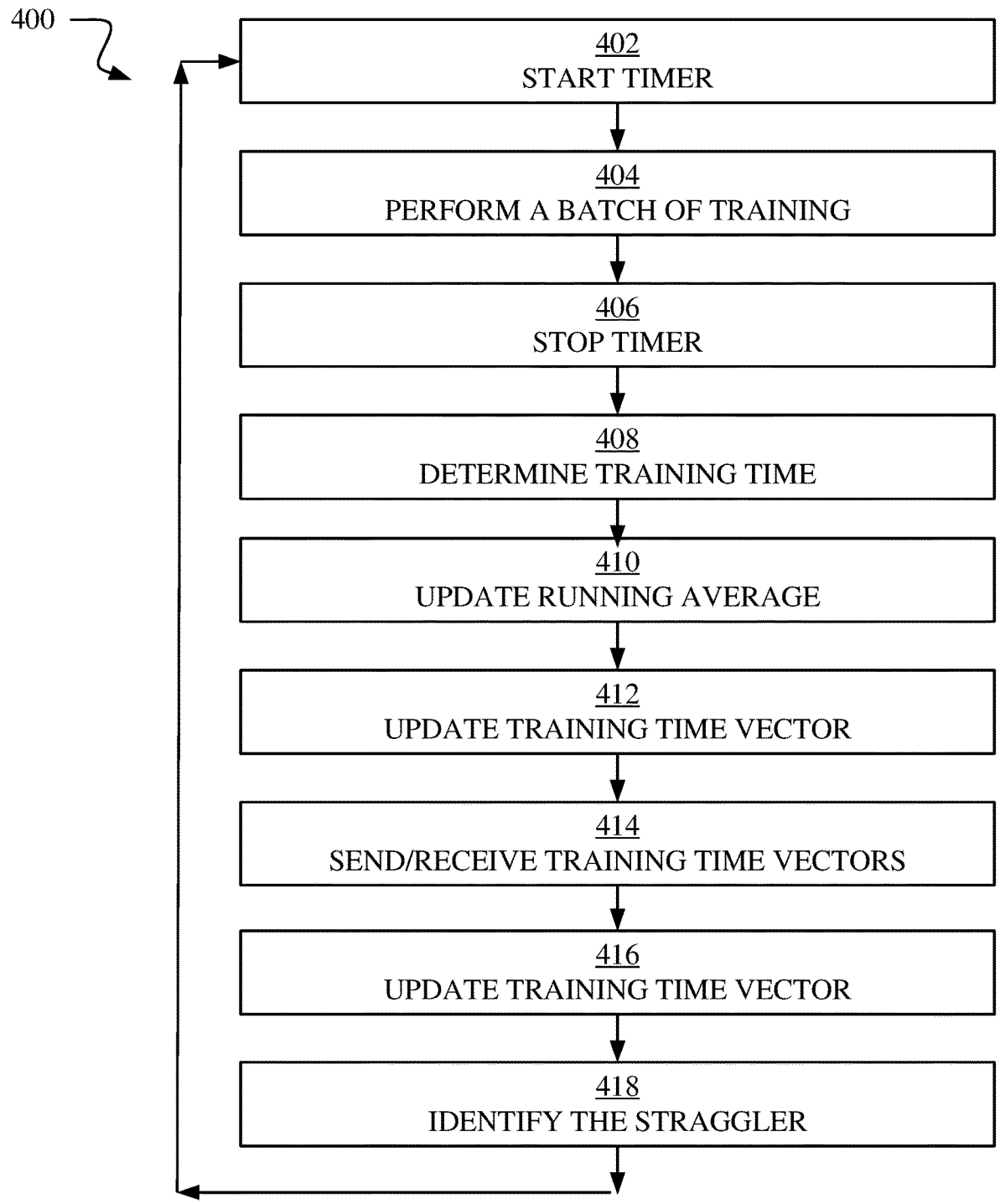
FIG. 4 is a process flow diagram of a method for identifying a straggler in decentralized distributed deep learning training, in accordance with some embodiments of the present disclosure.

FIG. 4 is a process flow diagram of a method 400 for identifying a straggler in decentralized distributed deep learning training, in accordance with some embodiments of the present disclosure. In some embodiments of the present disclosure, the learner 104 and the learner manager 112, described with respect to FIG. 1, may perform the method 400.

At operation 402, the learner manager 112 can start a timer. Starting the timer enables the timer to record when the learner manager's learner begins to perform one batch of training.

At operation 404, the learner 104 may thus perform a batch of training. Performing a batch of training can involve the learner 104 performing classifications and learning from those classifications.

At operation 406, the learner manager 112 can stop the timer. Stopping the timer at the end of the training enables the timer to record the time when the training stops.

At operation 408, the learner manager 112 can determine the training time. Determining the training time can involve determining the difference between the times at the start and stop of the timer.

At operation 410, the learner manager 112 can update a running average. In some embodiments, the learner manager 112 maintains a running average of training times for the learner 104. Thus, with each batch of training, the learner manager 112 updates the total training time for all batches and divides by the associated number of batches.

At operation 412, the learner manager 112 can update the training time vector, such as the training time vector 110. Updating the training time vector 110 can involve updating the training time in the training time vector 110 with the current training time or the running average.

At operation 414, the learner manager 112 can send and receive training time vectors 110. The learner manager 112 can send the training time vector 110 for its associated learner 104 to the learner's neighbors. Additionally, the learner manager 112 can receive the training time vectors 110 from the learner's neighbors.

At operation 416, the learner manager 112 can update the training time vector 110. Having received the training time vectors 110 from the learner's neighbors, the learner manager 112 can thus update the training times in its own training time vector with training times in the received training time vectors.

At operation 418, the learner manager 112 can identify the straggler. Identifying the straggler can involve identifying the learner 104 with the longest training time, and/or with a training time that exceeds a predetermined threshold. Alternatively, the straggler can have a training time outside a threshold time. In some embodiments, the threshold time can be based on the standard deviation of the training times of all the learners 104. In some embodiments, the learner manager 112 can identify multiple stragglers.

Figure 5:
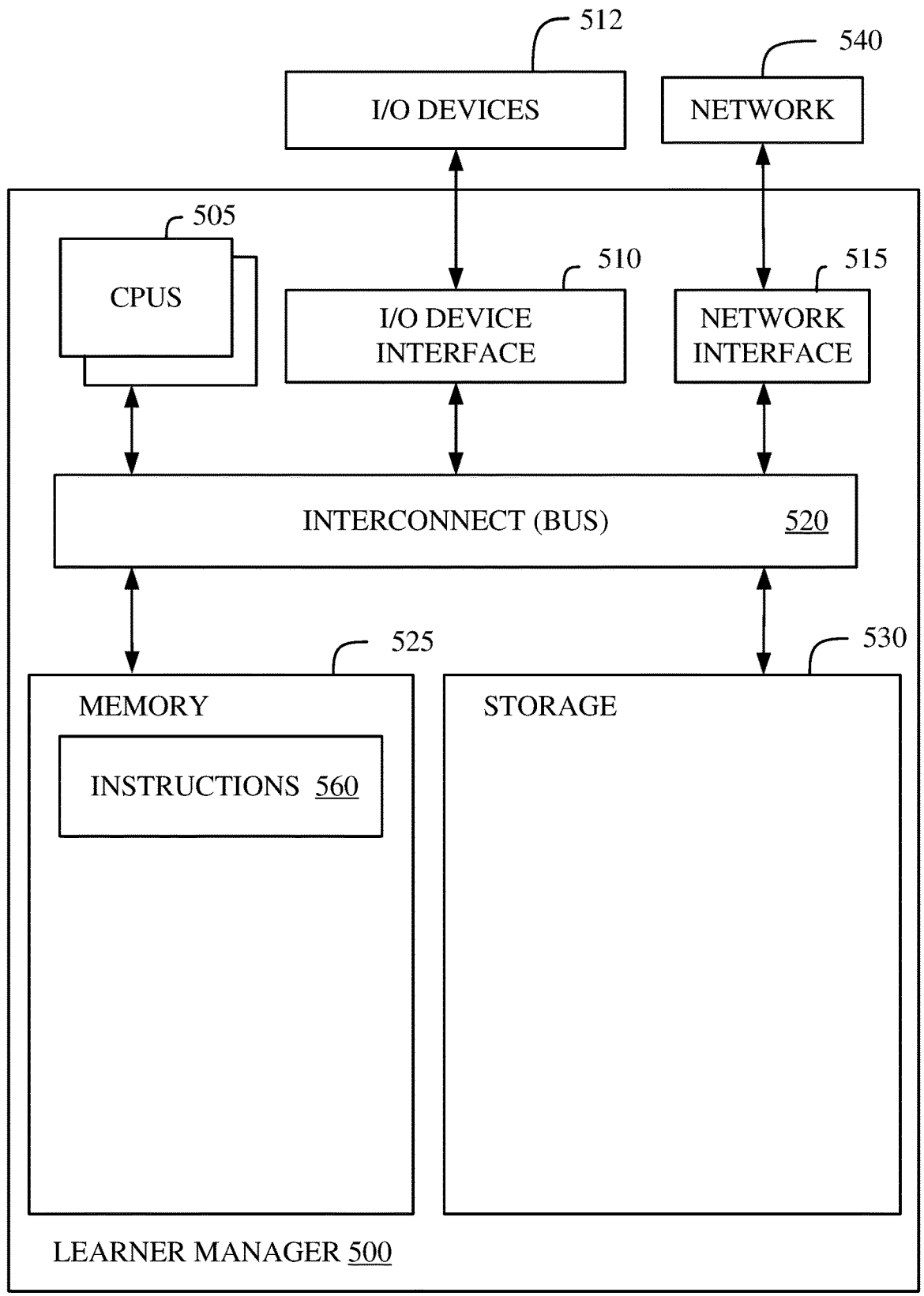
FIG. 5 is a block diagram of an example learner manager, in accordance with some embodiments of the present disclosure.

FIG. 5 is a block diagram of an example learner manager 500, in accordance with some embodiments of the present disclosure. In various embodiments, the learner manager 500 is similar to the learner manager 112 and can perform the methods described in FIGS. 3 and 4, and/or the functionality discussed in FIGS. 1 and 2A-2D. In some embodiments, the learner manager 500 provides instructions for the aforementioned methods and/or functionalities to a client machine such that the client machine executes the method, or a portion of the method, based on the instructions provided by the learner manager 500. In some embodiments, the learner manager 500 comprises software executing on hardware incorporated into a plurality of devices.

The learner manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of random access memory (e.g., static random access memory (SRAM), dynamic random access memory (DRAM), or Flash). The storage 530 is generally included to be representative of non-volatile memory, such as a hard disk drive, solid-state device (SSD), removable memory cards, optical storage, and/or flash memory devices. Additionally, the storage 530 can include storage area network (SAN) devices, the cloud, or other devices connected to the learner manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, of the methods described in FIGS. 3 and 4, and/or the functionality discussed in FIGS. 1 and 2A-2D.

In various embodiments, the I/O devices 512 include an interface capable of presenting information and receiving input. For example, I/O devices 512 can present information to a listener interacting with learner manager 500 and receive input from the listener.

The learner manager 500 is connected to the network 550 via the network interface 515. Network 550 can comprise a physical, wireless, cellular, or different network.

In some embodiments, the learner manager 500 can be a multi-user mainframe computer system, a single-user system, or a server computer or similar device that has little or no direct user interface but receives requests from other computer systems (clients). Further, in some embodiments, the learner manager 500 can be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary learner manager 500. In some embodiments, however, individual components can have greater or lesser complexity than as represented in FIG. 5, components other than or in addition to those shown in FIG. 5 can be present, and the number, type, and configuration of such components can vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
performing decentralized distributed deep learning training on a batch of training data for a plurality of learners;
determining a training time wherein a learner, of the plurality of learners, performs the decentralized distributed deep learning training on the batch of training data;
generating, by the learner, a table comprising:
the training time; and
a plurality of other processing times wherein a corresponding plurality of other learners, of the plurality of learners, performs the decentralized distributed deep learning training on a corresponding plurality of other batches of other training data;
providing, by the learner, the table to a neighboring learner of the plurality of learners;
determining, by the learner, that the learner is a straggler by determining, using a table generated by a neighboring learner of the learner, that the training time is greater than each of the plurality of other processing times;
modifying a processing aspect of the learner to reduce a future training time of the learner for performing the decentralized distributed deep learning training on a new batch of training data in response to determining the learner is the straggler, wherein modifying the processing aspect comprises increasing a frequency rate of a computational circuit of the straggler; and
performing, by the learner, the decentralized distributed deep learning training on the new batch of training data in less time than the training time by using the modified processing aspect.

2. The method of claim 1, further comprising performing the distributed deep learning training on an excess amount of straggler training data by the plurality of remaining learners.

3. The method of claim 1, further comprising modifying a processing aspect of a plurality of remaining learners.

4. The method of claim 3, wherein modifying the processing aspect of the plurality of remaining learners comprises decreasing a frequency rate of a computational circuit of one or more of the plurality of remaining learners.

5. A computer program product comprising program instructions stored on a computer readable storage medium, the program instructions executable by a processor to cause the processor to perform a method comprising:
performing decentralized distributed deep learning training on a batch of training data for a plurality of learners;
determining a training time wherein a learner, of the plurality of learners, performs the decentralized distributed deep learning training on the batch of training data;
generating, by the learner, a table comprising:
the training time; and
a plurality of other processing times wherein a corresponding plurality of other learners perform the decentralized distributed deep learning training on a corresponding plurality of other batches of other training data;
determining, by the learner, that the learner is a straggler by determining, using a table generated by a neighboring learner of the learner, that the training time is greater than each of the plurality of other processing times;
modifying a processing aspect of the learner to reduce a future training time of the learner for performing the decentralized distributed deep learning training on a new batch of training data in response to determining the learner is the straggler, wherein modifying the processing aspect comprises increasing a frequency rate of a computational circuit of the straggler; and
performing, by the learner, the decentralized distributed deep learning training on the new batch of training data in less time than the training time by using the modified processing aspect.

6. The computer program product of claim 5, the method further comprising performing the distributed deep learning training on an excess amount of straggler training data by the plurality of remaining learners.

7. The computer program product of claim 5, the method further comprising modifying a processing aspect of a plurality of remaining learners.

8. The computer program product of claim 7, wherein modifying the processing aspect of the plurality of remaining learners comprises decreasing a frequency rate of a computational circuit of one or more of the plurality of remaining learners.

9. A system comprising:
a computer processing circuit; and
a computer-readable storage medium storing instructions, which, when executed by the computer processing circuit, are configured to cause the computer processing circuit to perform a method comprising:
performing decentralized distributed deep learning training on a batch of training data for a plurality of learners;
determining a training time wherein a learner, of the plurality of learners, performs the decentralized distributed deep learning training on the batch of training data;
generating, by the learner, a table comprising:

the training time; and a plurality of other processing times wherein a corresponding plurality of other learners, of the plurality of learners, performs the decentralized distributed deep learning training on a corresponding plurality of other batches of other training data;

providing, by the learner, the table to a neighboring learner of the plurality of learners;

determining, by the learner, that the learner is a straggler by determining, using a table generated by a neighboring learner of the learner, that the training time is greater than each of the plurality of other processing times;

modifying a processing aspect of the learner to reduce a future training time of the learner for performing the decentralized distributed deep learning training on a new batch of training data in response to determining the learner is the straggler, wherein modifying the processing aspect comprises increasing a frequency rate of a computational circuit of the straggler; and performing, by the learner, the decentralized distributed deep learning training on the new batch of training data in less time than the training time by using the modified processing aspect.

10. The system of claim 9, the method further comprising:
performing the distributed deep learning training on an excess amount of straggler training data by the plurality of remaining learners.

11. The system of claim 9, the method further comprising modifying a processing aspect of a plurality of remaining learners.

12. The system of claim 11, wherein modifying the processing aspect of the plurality of remaining learners comprises decreasing a frequency rate of a computational circuit of one or more of the plurality of remaining learners.

* * * * *